United States Patent
Hane

(10) Patent No.: US 7,579,820 B2
(45) Date of Patent: Aug. 25, 2009

(54) PWM/PFM CONTROL CIRCUIT AND SWITCHING POWER SUPPLY CIRCUIT

(75) Inventor: Norimasa Hane, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 166 days.

(21) Appl. No.: 11/866,729

(22) Filed: Oct. 3, 2007

(65) Prior Publication Data

US 2009/0033305 A1    Feb. 5, 2009

(30) Foreign Application Priority Data

Oct. 3, 2006    (JP) ............... 2006-272231

(51) Int. Cl.
    *G05F 1/40*    (2006.01)
(52) U.S. Cl. ............... 323/288; 323/284
(58) Field of Classification Search ........... 323/222, 323/282–288, 290, 351
    See application file for complete search history.

(56) References Cited

U.S. PATENT DOCUMENTS

| | | | |
|---|---|---|---|
| 3,241,102 A * | 3/1966 | Peterson | 367/73 |
| 6,100,675 A | 8/2000 | Sudo | |
| 7,061,213 B2 * | 6/2006 | Yoshida | 323/224 |
| 2008/0224674 A1 * | 9/2008 | Hasegawa | 323/271 |
| 2009/0079408 A1 * | 3/2009 | Qiao et al. | 323/283 |
| 2009/0079410 A1 * | 3/2009 | Ohkawa et al. | 323/290 |

FOREIGN PATENT DOCUMENTS

JP    11155281 A    6/1999

* cited by examiner

*Primary Examiner*—Jessica Han
(74) *Attorney, Agent, or Firm*—The Webb Law Firm

(57) ABSTRACT

A PWM/PFM control circuit has a differential time generating means for forming a differential time signal representing a differential time corresponding to a difference between the pulse width of a PWM control signal and the pulse width of a PFM control signal on condition that the pulse width of the PWM control signal is smaller than the pulse width of the PFM control signal, and the oscillation frequency of a reference signal serving as a reference for forming the PWM control signal is controlled based on the differential time signal to a low value in accordance with the differential time.

17 Claims, 12 Drawing Sheets

PWM/PFM CONTROL CIRCUIT AND SWITCHING POWER SUPPLY CIRCUIT

The entire disclosure of Japanese Patent Application No. 2006-272231 filed Oct. 3, 2006 is expressly incorporated by reference herein.

BACKGROUND OF THE INVENTION

1. Field of the Invention

This invention relates to a PWM/PFM control circuit and a switching power supply circuit and, more specifically, to those which are useful when improving efficiency under a light load of the switching power supply circuit.

2. Description of the Related Art

Among switching power supply circuits according to earlier technologies is that having a PWM/PFM control circuit which works under PWM control when load is a heavy load of a predetermined value or higher, and works under PFM control when the load is a light load of less than the predetermined value. An example of this type of switching power supply circuit is shown in FIG. 10. As shown in this drawing, such a switching power supply circuit is a combination of a chopper circuit, as an object to be controlled, and a PWM/PFM control circuit. When a switching element SW is turned on in the chopper circuit, current flows along a path, power source VIN→reactor L→switching element SW→power source VIN, and energy accumulated in the reactor L increases. When the switching element SW is turned off, the energy accumulated in the reactor L is released to the load side, and current flows along a path, power source VIN→reactor L→diode SD→capacitor C0 or load→power source VIN.

On the other hand, the PWM/PFM control circuit for exercising the on/off control of the switching element SW of the chopper circuit has a comparator 1 for comparing a reference voltage VREF with an output feedback voltage which is obtained by dividing the output voltage VOUT of the chopper circuit by resistances R1 and R2; a PWM control signal generator 2 for comparing an error signal S1, which is the output of the comparator 1 and represents a difference between both voltages, with a ramp signal S2 to output a PWM control signal S3; and a PFM control signal generator 3 for generating a PFM control signal S4, as a pulse signal turning the switching element SW on for a certain period of time, based on the PWM control signal S3 as the output of the PWM control signal generator 2.

The ramp signal S2 is obtained as an output signal of a triangular wave generator 5 based on a reference signal S6 which is the output of an oscillator 4. The PFM control signal S4 is formed based on the PWM control signal S3. A logic circuit 6 receives the PWM control signal S3 and the PFM control signal S4, and outputs a switch control signal S5 corresponding to the signal of the greater pulse width of the signals S3 and S4, thereby controlling the on/off state of the switching element SW. The logic circuit 6 comprises a NOR circuit 7 for adopting the nor logic of the PWM control signal S3 and the PFM control signal S4, and an inverter 8 for inverting the output of the NOR circuit 7. The switching element SW is formed from an N-channel transistor, and the gate of this transistor is supplied with the switch control signal S5.

FIGS. 11A to 11F are waveform charts showing the signal waveforms of the respective portions of the switching power supply circuit according to the earlier technology. FIG. 11A represents the output voltage VOUT, FIG. 11B represents the relationship between the error signal Si and the ramp signal S2, FIG. 11C represents the reference signal S6 as a reference for forming the PWM control signal S3 of a cycle T, FIG. 11D represents the PWM control signal S3, FIG. 11E represents the PFM control signal S4, and FIG. 11F represents the switch control signal S5.

As will become clear by reference to these charts, when the pulse width of the PWM control signal S3 formed from the error signal based on the output voltage VOUT and the ramp signal based on the reference signal S6 (the pulse width changes with load) is smaller than the pulse width of the PFM control signal S4 (the pulse width is constant), namely, under a light load, the switch control signal S5 based on the PFM control signal S4 is formed. When the load increases and the pulse width of the PWM control signal S3 becomes larger than the pulse width of the PFM control signal S4, the switch control signal S5 based on the PWM control signal S3 is formed.

As noted here, under light load, the pulse width of the PWM control signal S3 is small, and its oscillation is intermittent (at intervals based on the oscillation frequency during PWM action). The switching power supply circuit performs a PFM action of a varying frequency. Under a heavy load, a PWM action is performed in which the pulse width of the PWM control signal S3 is greater than the pulse width of the PFM control signal S4, and oscillation frequency is fixed. Under both conditions, the ripple voltage of the output voltage VOUT is low.

However, in a region where the PFM action is shifted to the PWM action, the PWM control signal S3 enters into a state where certain pulses of the oscillation frequency during the PWM action have been thinned out, posing the problem that the ripple voltage of the output voltage VOUT involves ripples of the oscillation frequency during the PWM action and great pulsations of a low frequency.

FIG. 12 is a characteristic chart showing the ripple voltage characteristics of the switching power supply circuit according to the earlier technology. With the above-described switching power supply circuit according to the earlier technology, as shown in the drawing, a high ripple voltage occurs in a transitional mode (in FIG. 12, a range with a load current of from 10 mA to 100 mA) in which changeover from the PFM action to the PWM action takes place.

Japanese Unexamined Patent Publication No. 1999-155281 discloses a means of obtaining efficiency under light load by changing the value of constant current to decrease the frequency of PWM control itself. However, as paragraph [0014] of this publication indicates, the above means encounters the problem that the ripple voltage increases.

SUMMARY OF THE INVENTION

The present invention has been accomplished in the light of the above-mentioned earlier technologies. It is an object of the present invention to provide a PWM/PFM control circuit and a switching power supply circuit, which can decrease a ripple voltage during transition from PFM control under a light load to PWM control under a heavy load to realize a smooth transition of a control mode.

A first aspect of the present invention, for attaining the above object, is a PWM/PFM control circuit which, when a load on an object to be controlled is a heavy load of a predetermined value or higher, acts under PWM control for determining a pulse width in accordance with the load, and which, when the load is a light load of less than the predetermined value, acts under PFM control for determining a frequency in accordance with the load, the PWM/PFM control circuit having differential time generating means for forming a differential time signal representing a differential time corresponding to a difference between a pulse width of a PWM control signal and a pulse width of a PFM control signal on condition that the pulse width of the PWM control signal is smaller than the pulse width of the PFM control signal, and wherein an oscillation frequency of a reference signal serving as a reference for forming the PWM control signal is controlled based on the differential time signal to a low value in accordance with the differential time.

A second aspect of the present invention is the PWM/PFM control circuit according to the first aspect, wherein the PFM control signal is formed based on the PWM control signal.

A third aspect of the present invention is the PWM/PFM control circuit according to the first or second aspect, wherein the differential time generating means forms the differential time signal representing the differential time based on an on-period determined by the PFM control signal during an off-period determined by the PWM control signal, and an oscillation frequency of an oscillator for generating the reference signal is controlled based on the differential time signal.

A fourth aspect of the present invention is the PWM/PFM control circuit according to the first or second aspect, wherein the differential time generating means forms the differential time signal representing the differential time based on an on-period determined by the PFM control signal during an off-period determined by the PWM control signal, and a triangular wave generator for generating a ramp signal functioning as the reference signal is controlled based on the differential time signal.

A fifth aspect of the present invention is the PWM/PFM control circuit according to the first aspect, further comprising: an oscillator for generating the reference signal; a triangular wave generator for generating a ramp signal based on the reference signal; a PWM control signal generator which compares an error signal with the ramp signal to generate a PWM control signal having a pulse width conformed to the error signal, the error signal representing a difference between a signal representing a voltage of an output terminal of the object to be controlled, and a predetermined reference value, and the error signal being obtained by comparing the signal with the predetermined reference value; a PFM control signal generator for generating a PFM control signal based on the PWM control signal; a logic circuit for feeding a switch control signal which controls an on-off state of a switching element of the object to be controlled, based on the PWM control signal or the PFM control signal whichever has the larger pulse width; and the differential time generating means for forming the differential time signal representing the differential time corresponding to the difference between the pulse width of the PWM control signal and the pulse width of the PFM control signal, and wherein an oscillation frequency of the oscillator is controlled based on the differential time signal.

A sixth aspect of the present invention is the PWM/PFM control circuit according to the first aspect, further comprising: a triangular wave generator for generating a ramp signal which is the reference signal; a PWM control signal generator which compares an error signal with the ramp signal to generate a PWM control signal having a pulse width conformed to the error signal, the error signal representing a difference between a signal representing a voltage of an output terminal of the object to be controlled, and a predetermined reference value, and the error signal being obtained by comparing the signal with the predetermined reference value; a PFM control signal generator for generating a PFM control signal based on the PWM control signal; a logic circuit for feeding a switch control signal which controls an on-off state of a switching element of the object to be controlled, based on the PWM control signal or the PFM control signal whichever has the larger pulse width; and the differential time generating means for forming the differential time signal representing the differential time corresponding to the difference between the pulse width of the PWM control signal and the pulse width of the PFM control signal, and wherein an oscillation frequency of the ramp signal of the triangular wave generator is controlled based on the differential time signal.

A seventh aspect of the present invention is the PWM/PFM control circuit according to the first aspect, further comprising: a PWM comparator which compares an error signal with a feedback current signal to output a reset signal for defining the pulse width of the PWM control signal, the error signal representing a difference between a signal representing a voltage of an output terminal of the object to be controlled, and a predetermined reference value, the error signal being obtained by comparing the signal with the predetermined reference value, and the feedback current signal being based on a current flowing through the object to be controlled; an oscillator for generating the reference signal; a flip-flop circuit for forming the PWM control signal which rises upon setting by the reference signal and falls upon resetting by the reset signal; a PFM control signal generator for generating the PFM control signal based on the reference signal; a logic circuit for feeding a switch control signal which controls an on-off state of a switching element of the object to be controlled, based on the PWM control signal or the PFM control signal whichever has the larger pulse width; and the differential time generating means for forming the differential time signal representing the differential time corresponding to the difference between the pulse width of the PWM control signal and the pulse width of the PFM control signal, and wherein an oscillation frequency of the oscillator is controlled based on the differential time signal.

An eighth aspect of the present invention is the PWM/PFM control circuit according to the third, fifth or seventh aspect, wherein the oscillator is formed from a ring oscillator, and a charging current for charging an inlet-side capacitor of the ring oscillator is blocked by the differential time signal, whereby the oscillation frequency of the reference signal serving as the reference for forming the PWM control signal is controlled to the low value.

A ninth aspect of the present invention is the PWM/PFM control circuit according to the fourth or sixth aspect, wherein the triangular wave generator generates the ramp signal by utilizing charging or discharging of a capacitor, and a charging or discharging current for charging or discharging the capacitor is blocked by the differential time signal, whereby the oscillation frequency of the ramp signal, which is the reference signal serving as the reference for forming the PWM control signal, is controlled to the low value.

A tenth aspect of the present invention is a switching power supply circuit comprising a combination of the PWM/PFM control circuit according to any one of the first to ninth aspects and a chopper circuit which is the object to be controlled.

According to the present invention, when the pulse width of the PWM control signal is smaller than the pulse width of the PFM control signal, the oscillation frequency of the reference signal is controlled to a low value based on the differential time corresponding to the difference between the pulse width of the PWM control signal and the pulse width of the PFM control signal.

Here, the state in which the pulse width of the PWM control signal is smaller than the pulse width of the PFM control signal represents a transitional mode in which control shifts from PFM control to PWM control.

As a result, if load gradually increases in such a transitional mode, the frequencies of the reference signal and the PWM control signal gradually increase, resulting in a shift to PWM control. In the above transitional mode representing transition from PFM control to PWM control, the present invention enables the output voltage to change gradually.

Consequently, the ripple voltage in the above-mentioned transitional mode can be dramatically decreased.

FIG. 1 is a characteristic chart showing the ripple voltage characteristics of the switching power supply circuit according to the present invention. With the switching power supply circuit according to the present invention, as shown in this drawing, the ripple voltage is gradually decreased in a transitional mode involving transition from the PFM action to the PWM action (in FIG. 1, the range where the load current is 10 mA to 100 mA), achieving a shift to PWM control. A comparison with FIG. 12 clearly shows that the ripple voltage is dramatically decreased in the transitional mode.

Under PFM control, electric power consumption is small, but the ripple component is great. Under PWM control, by contrast, power consumption is great, but the ripple component can be decreased.

BRIEF DESCRIPTION OF THE DRAWINGS

For a more complete understanding of the present invention and the advantages thereof, reference is now made to the following descriptions in conjunction with the accompanying drawings.

DESCRIPTION OF THE PREFERRED EMBODIMENTS

The embodiments and Examples of the present invention will now be described in detail with reference to the accompanying drawings.

First Embodiment

Figure 1:
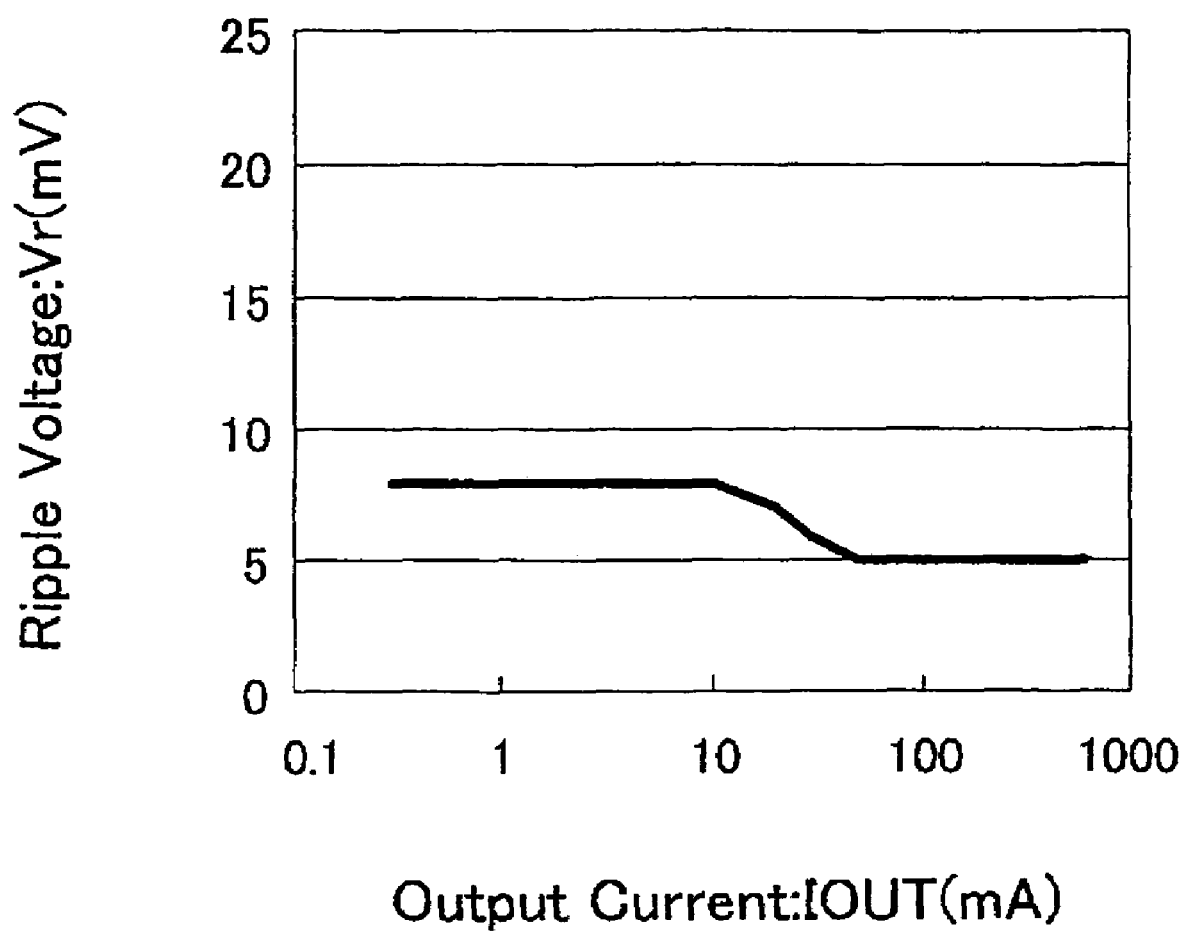
FIG. 1 is a characteristic chart showing the ripple voltage characteristics of a switching power supply circuit according to the present invention.
Figure 2:
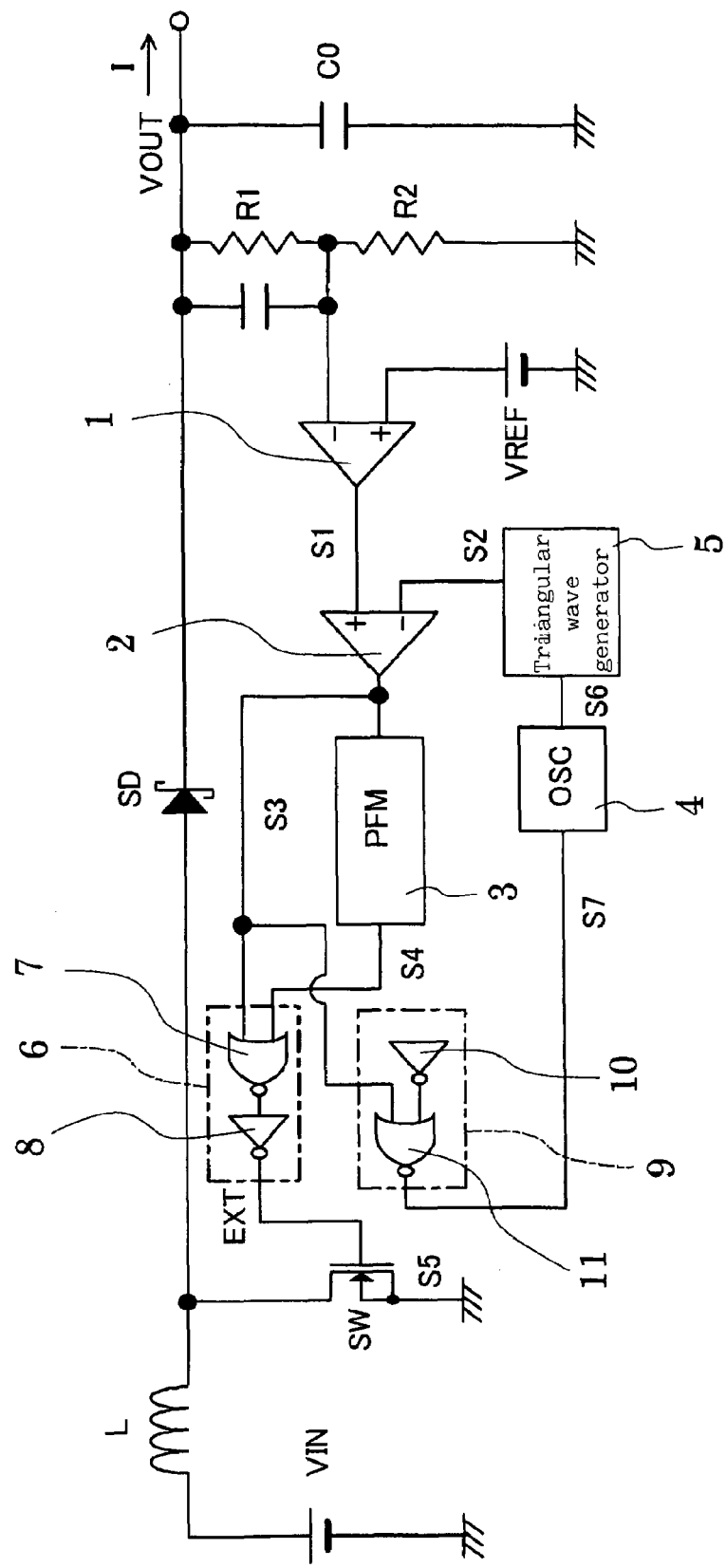
FIG. 2 is a circuit diagram showing a switching power supply circuit according to a first embodiment of the present invention.

FIG. 2 is a circuit diagram showing a switching power supply circuit according to a first embodiment of the present invention. This embodiment is a combination of the chopper circuit shown in FIG. 10 and a novel PWM/PFM control circuit. That is, the present embodiment is a switching power supply circuit which has the chopper circuit according to the earlier technology as an object to be controlled.

However, the object to be controlled need not be limited to such a chopper circuit. No limitations are imposed, as long as the object to be controlled is such that if the load on this object is a heavy load of a predetermined value or higher, the object is operated under PWM control by which the pulse width is determined by this load, and if the load is a light load of less than the predetermined value, the object is operated under PFM control by which the frequency is determined by this load (the same applies in each of the subsequent embodiments).

Figure 10:
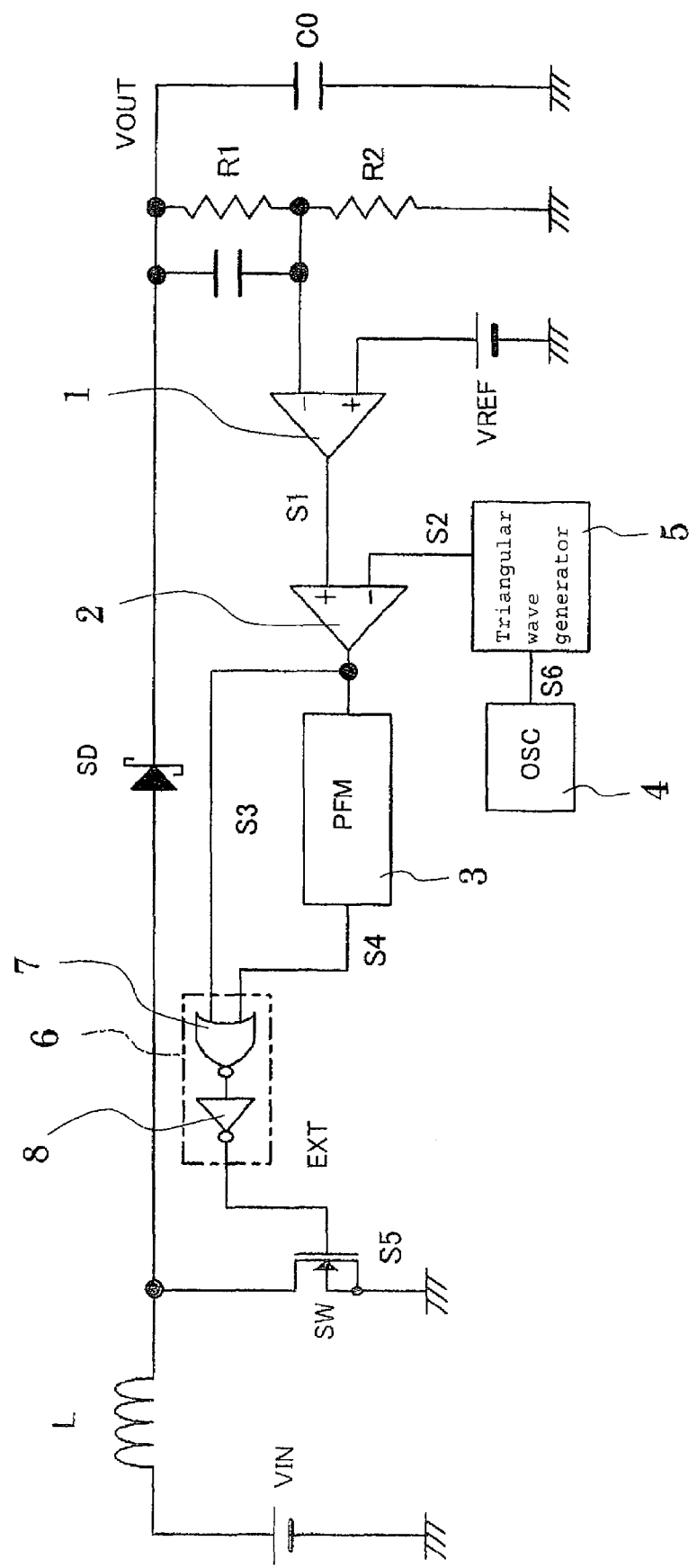
FIG. 10 is a circuit diagram showing a switching power supply circuit according to an earlier technology.
Figure 11:
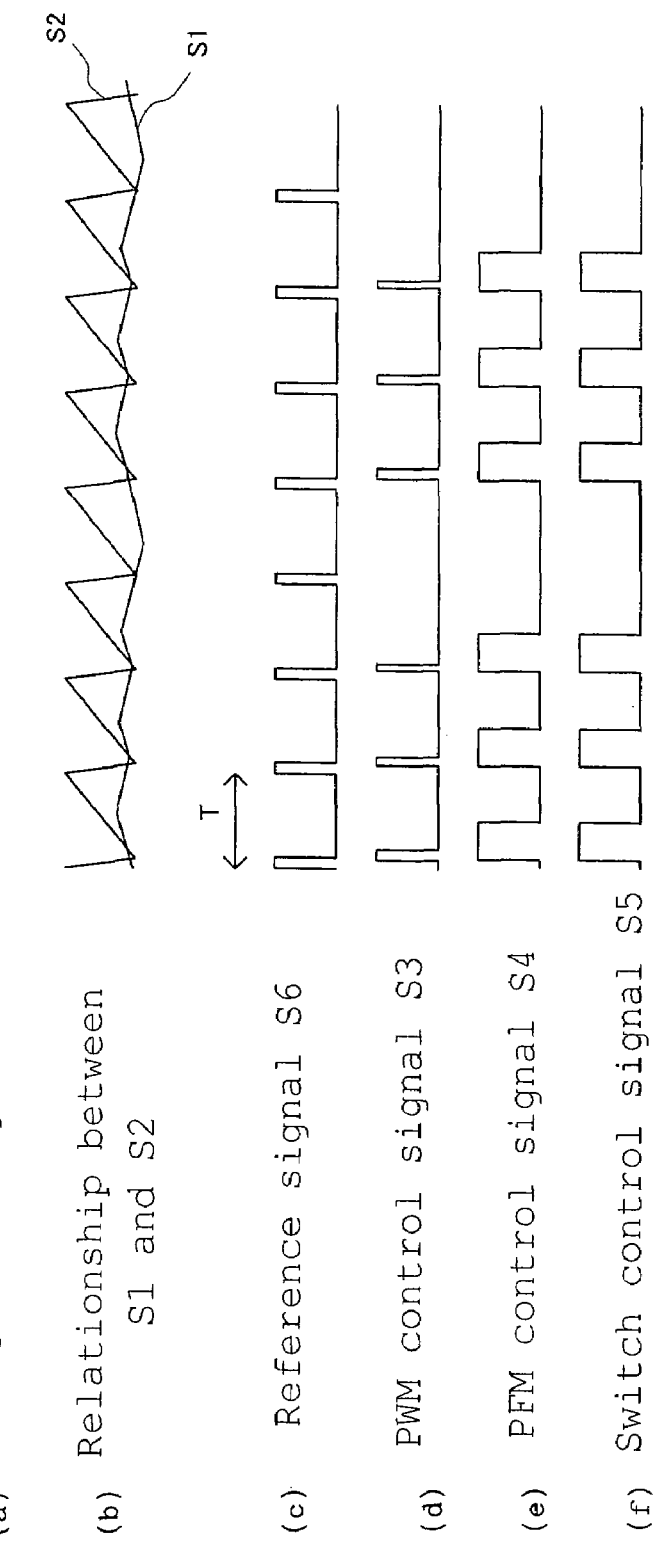
FIGS. 11A to 11F are timing charts showing the waveforms of respective portions of a PWM/PFM control circuit in the switching power supply circuit shown in FIG. 10.
Figure 12:
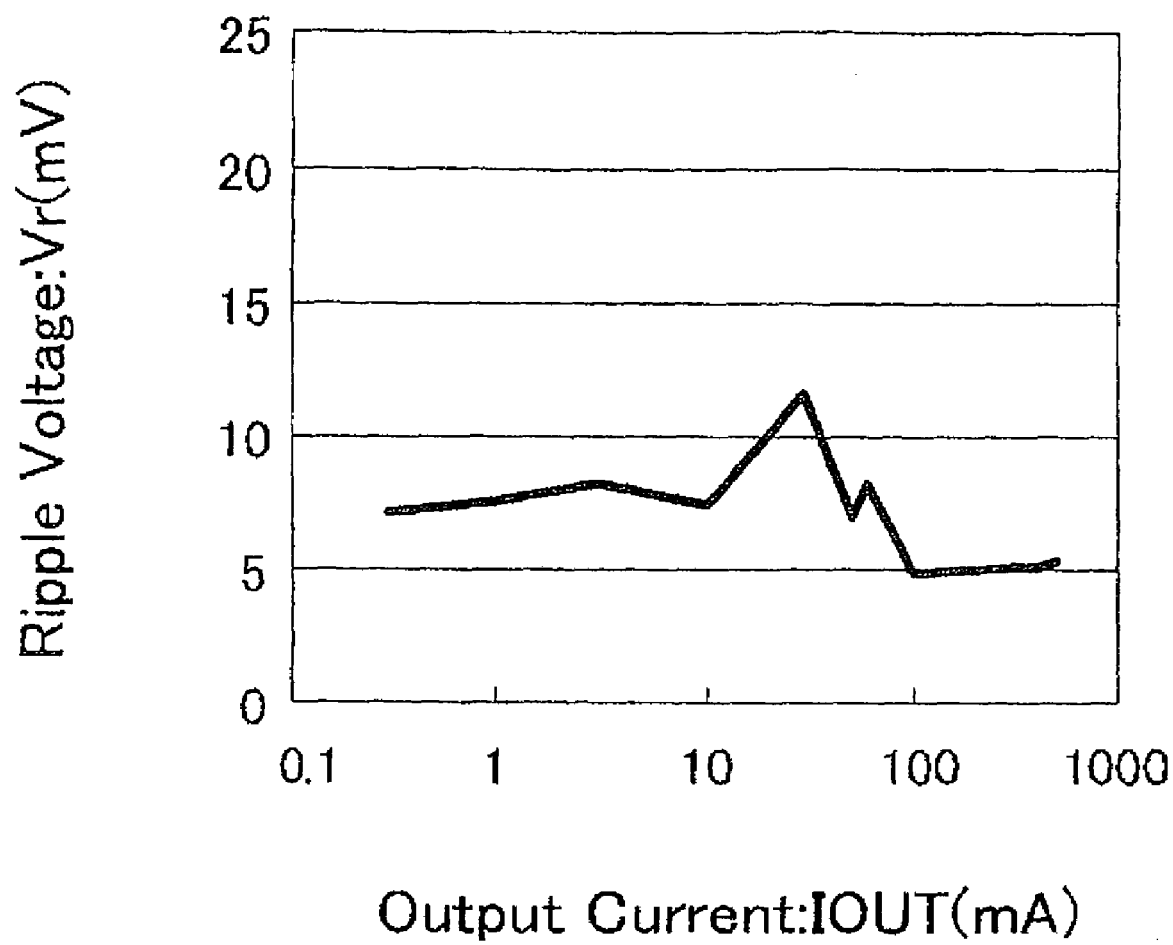
FIG. 12 is a characteristic chart showing the ripple voltage characteristics of the switching power supply circuit according to the earlier technology.

As shown in FIG. 2, the PWM/PFM control circuit of the switching power supply circuit according to the present embodiment has a differential time generating means 9 added to the PWM/PFM control circuit according to the earlier technology shown in FIG. 10. That is, the PWM/PFM control circuit of FIG. 2 has resistances R1 and R2, a comparator 1, a PWM control signal generator 2, a PFM control signal generator 3, an oscillator 4, a triangular wave generator 5, and a logic circuit 6, which are identical with those according to the earlier technology shown in FIG. 10, and the respective portions have the same functions as those of the corresponding portions in FIG. 10.

The differential time generating means 9 forms a differential time signal S7, which represents a differential time corresponding to the difference between the pulse width of a PWM control signal S3 and the pulse width of a PFM control signal S4, on condition that the pulse width of the PWM control signal S3 is smaller than the pulse width of the PFM control signal S4. Concretely, the differential time signal S7 representing the differential time between both signals is formed based on an on-period determined by the PFM control signal S4 during an off-period determined by the PWM control signal S3.

The differential time generating means 9 in the present embodiment is formed from a NOR circuit 11 which adopts the NOR logic of the PWM control signal S3 and the PFM control signal S4 inverted by an inverter 10. Needless to say, however, this is not limitative, and there are no limitations, if the differential time generating means 9 can achieve the function of forming the differential time signal S7 which represents a differential time corresponding to the difference between the pulse width of the PWM control signal S3 and the pulse width of the PFM control signal S4.

The differential time signal S7 is not necessarily required to coincide with the above differential time, and may be a function of the differential time.

The above oscillator 4 in the present embodiment, namely, a circuit for generating a reference signal S6 serving as a reference for forming the PWM control signal S3, is controlled based on the differential time signal S7 such that the oscillation frequency of the reference signal S6 becomes lower in accordance with the above differential time.

Figure 3:
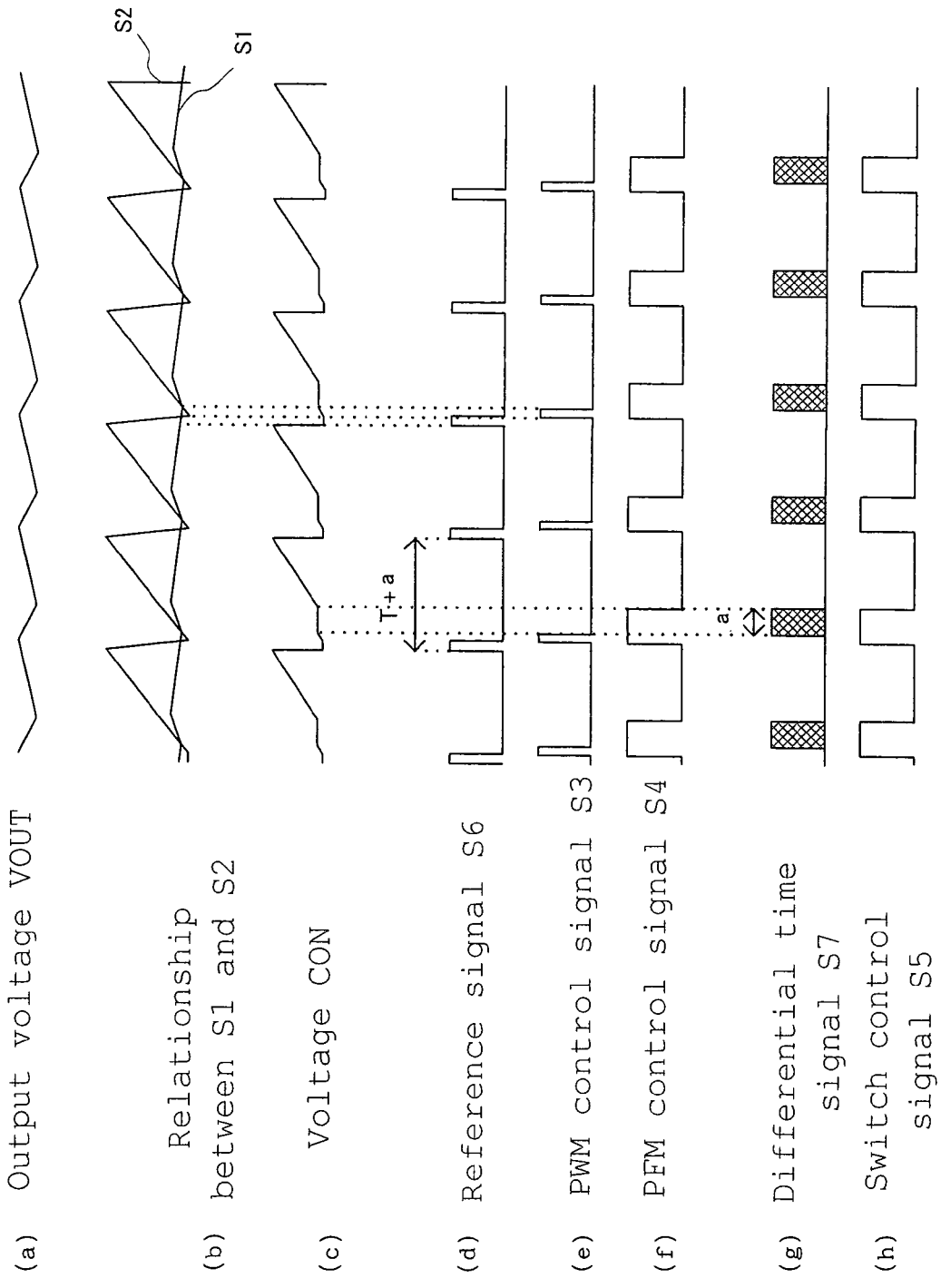
FIGS. 3A to 3H are timing charts showing the waveforms of respective portions of a PWM/PFM control circuit in the switching power supply circuit shown in FIG. 2.

FIGS. 3A to 3H are timing charts showing the waveforms of respective portions of the PWM/PFM control circuit in the switching power supply circuit according to the present embodiment. FIG. 3A represents the output voltage VOUT, FIG. 3B represents the relationship between the error signal S1 and the ramp signal S2, FIG. 3C represents the voltage CON of an input-side capacitor C1 (see FIG. 8) in the oscillator 4 (in this connection, details will be given later based on FIG. 8), FIG. 3D represents the reference signal S6 as a reference for forming the PWM control signal S3 of a cycle T, FIG. 3E represents the PWM control signal S3, FIG. 3F represents the PFM control signal S4, FIG. 3G represents the differential time signal S7, and FIG. 3H represents a switch control signal S5.

According to the present embodiment, as shown in these drawings, when the pulse width of the PWM control signal S3 is smaller than the pulse width of the PFM control signal S4, the differential time signal S7 representing a differential time a corresponding to the difference between the pulse width of the PWM control signal S3 and the pulse width of the PFM control signal S4 is formed by the differential time generating means 9 (see FIG. 2), and is supplied to the oscillator 4 (see FIG. 2). As a result, the oscillation frequency of the reference signal S6 decreases (the cycle becomes "T+a") in accordance with the differential time abased on the differential time signal S7.

In such a mode, the switch control signal S5 becomes based on the PFM control signal S4. Since the PFM control signal S4 is based on the PWM control signal S3, the PFM control signal S4 and the switch control signal S5 are also decreased correspondingly in frequency. In conformity with this decrease, therefore, the on-time of the switching element SW within a constant period becomes shorter, with the result that the output voltage VOUT decreases compared with the earlier technology shown in FIG. 10.

Figure 4:
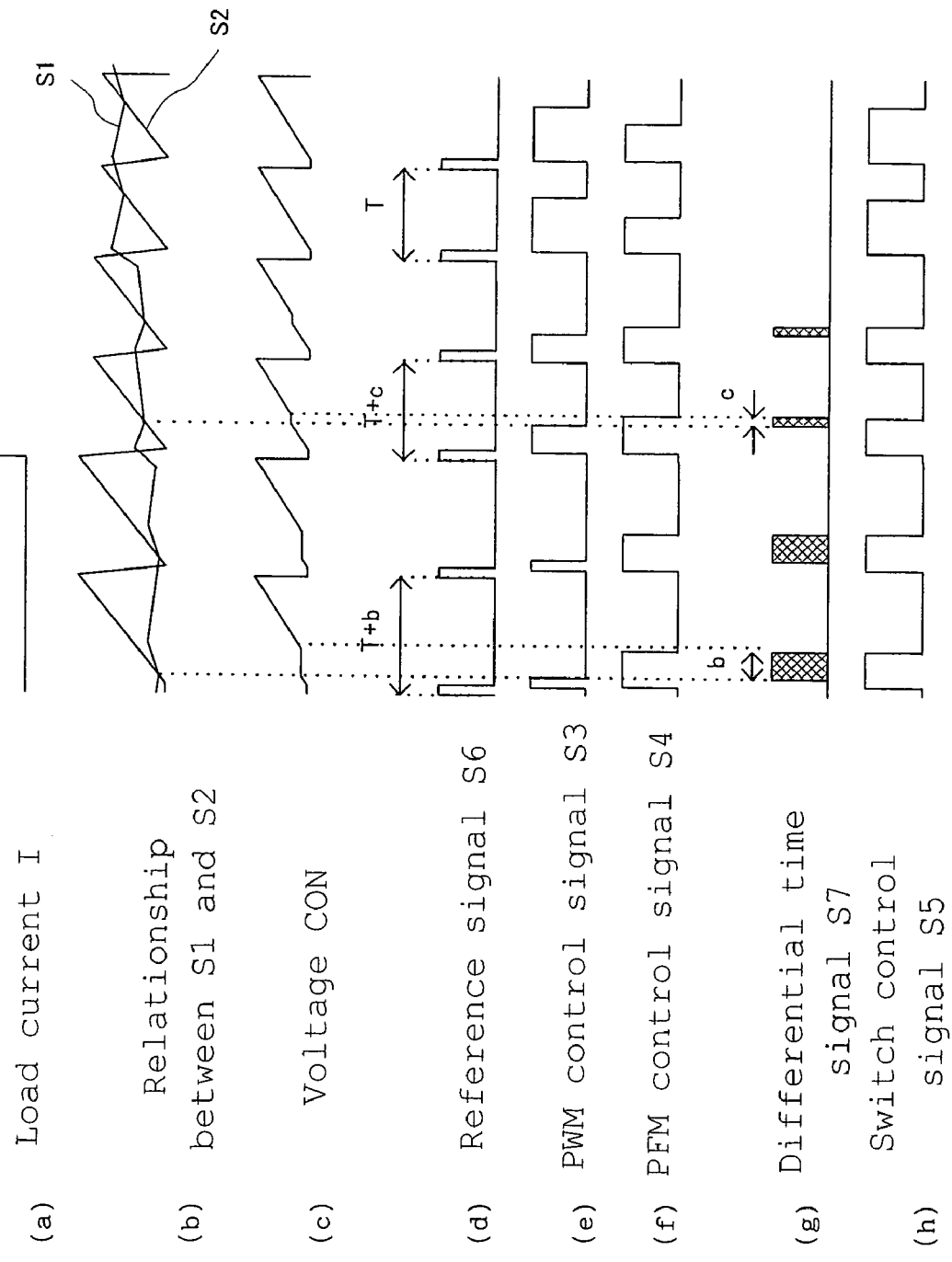
FIGS. 4A to 4H are timing charts showing the waveforms of the respective portions of the PWM/PFM control circuit in the switching power supply circuit shown in FIG. 2 during load changes.

On the other hand, the waveforms of the respective portions during load changes, namely, in a transitional mode in which the pulse width of the PWM control signal S3 is smaller than the pulse width of the PFM control signal S4, but as the load gradually increases, the operation shifts to PWM control, are as shown, for example, in timing charts as FIGS. 4A to 4H. Of these drawings, FIG. 4A represents a load current I, FIG. 4B represents the relationship between the error signal S1 and the ramp signal S2, FIG. 4C represents the voltage CON of the input-side capacitor C1 (see FIG. 8) in the oscillator 4 (in this connection, details will be given later based on FIG. 8), FIG. 4D represents the reference signal S6 as a reference for forming the PWM control signal S3 of a cycle T, FIG. 4E represents the PWM control signal S3, FIG. 4F represents the PFM control signal S4, FIG. 4G represents the differential time signal S7, and FIG. 4H represents the switch control signal S5.

In the present embodiment, as shown in FIGS. 4A to 4H, the load current I changes in 3 steps. With this increase in the load current I, the pulse width of the PWM control signal S3 grows. As a result, the differential time of the differential time signal S7 representing the difference between the pulse width of the PWM control signal S3 and the pulse width of the PFM control signal S4 changes from a differential time b to a differential time c of a smaller pulse width. Eventually, control shifts to PWM control.

Such a change from the differential time b to the differential time c is reflected as a change in the oscillation frequency of the reference signal S6, and the PFM control signal S4 and the switch control signal S5 as well as the PWM control signal S3 also respond, and change in frequency. In conformity with these changes, therefore, the on-time of the switching element SW within a constant period becomes longer. The output voltage VOUT decreases compared with the earlier technology shown in FIG. 10, but the output voltage VOUT can be increased gradually toward a PWM control mode in which the output voltage VOUT is defined by the PWM control signal S3.

As a result, the ripple component of the output voltage VOUT in such a transitional mode can be dramatically decreased.

Second Embodiment

Figure 5:
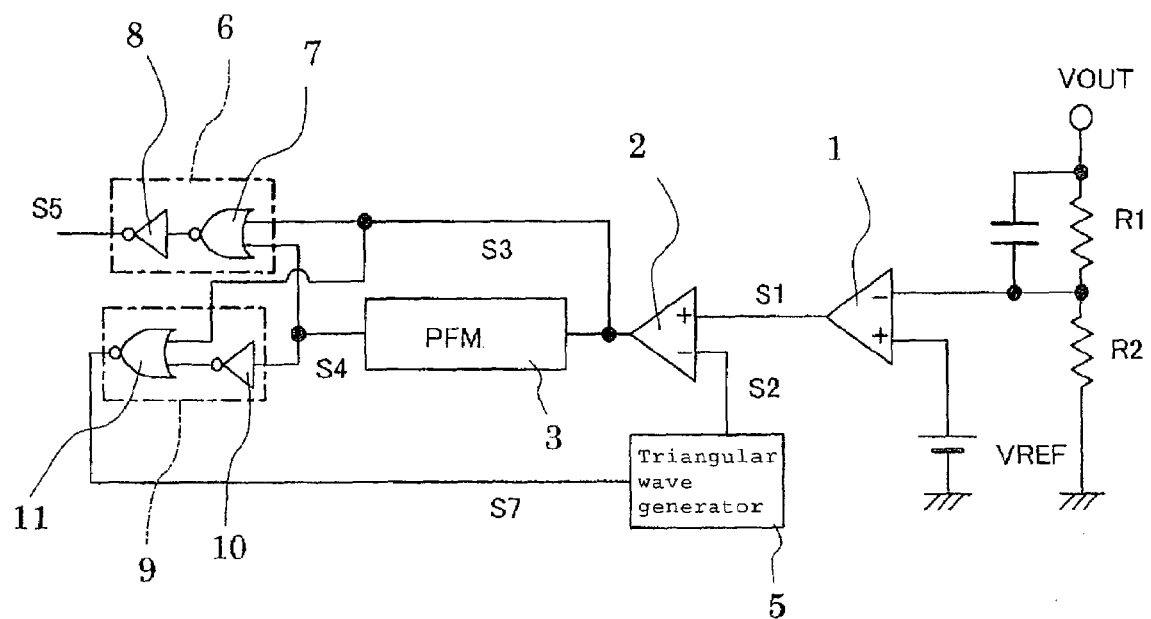
FIG. 5 is a circuit diagram showing a PWM/PFM control circuit according to a second embodiment of the present invention.

FIG. 5 is a circuit diagram showing a PWM/PFM control circuit in a switching power supply circuit according to a second embodiment of the present invention. In the present embodiment, as shown in this drawing, a differential time signal S7 is directly supplied to a triangular wave generator 5, and the oscillation frequency of a ramp signal S2, which is the output signal of the triangular wave generator 5, is controlled based on the differential time signal S7. Other features are exactly the same as those of the PWM/PFM control circuit of the switching power supply circuit shown in FIG. 2. Thus, the same portions as those in FIG. 2 are assigned the same numerals and symbols as in FIG. 2, and duplicate explanations are omitted.

Figure 6:
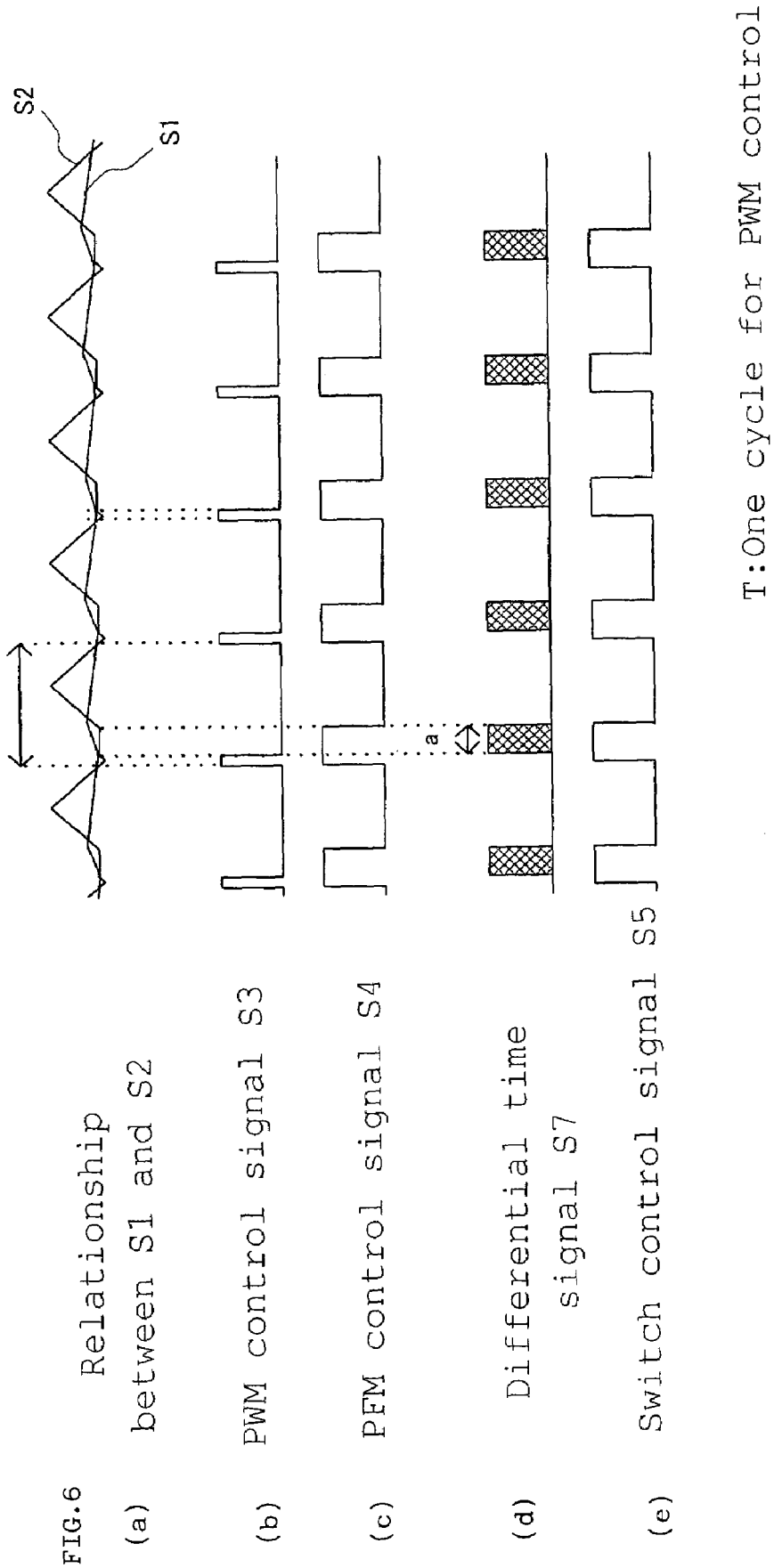
FIGS. 6A to 6E are timing charts showing the waveforms of respective portions of the PWM/PFM control circuit shown in FIG. 5.

FIGS. 6A to 6E are timing charts showing the waveforms of respective portions of the PWM/PFM control circuit according to the present embodiment. FIG. 6A represents the relationship between an error signal S1 and the ramp signal S2 as a reference signal in the present embodiment. FIG. 6B represents a PWM control signal S3. FIG. 6C represents a PFM control signal S4. FIG. 6D represents the differential time signal S7. FIG. 6E represents a switch control signal S5.

According to the present embodiment, as shown in these drawings, when the pulse width of the PWM control signal S3 is smaller than the pulse width of the PFM control signal S4, the differential time signal S7 representing a differential time a corresponding to the difference between the pulse width of the PWM control signal S3 and the pulse width of the PFM control signal S4 is formed by a differential time generating means 9 (see FIG. 2), and is supplied to the triangular wave generator 5 (see FIG. 2). As a result, the oscillation frequency of the ramp signal S2 becomes lower (the cycle becomes "T+a") in accordance with the differential time a based on the differential time signal S7. Here, T is one cycle for PWM control.

Thus, the present embodiment obtains the same actions and effects as those in the first embodiment.

Third Embodiment

Figure 7:
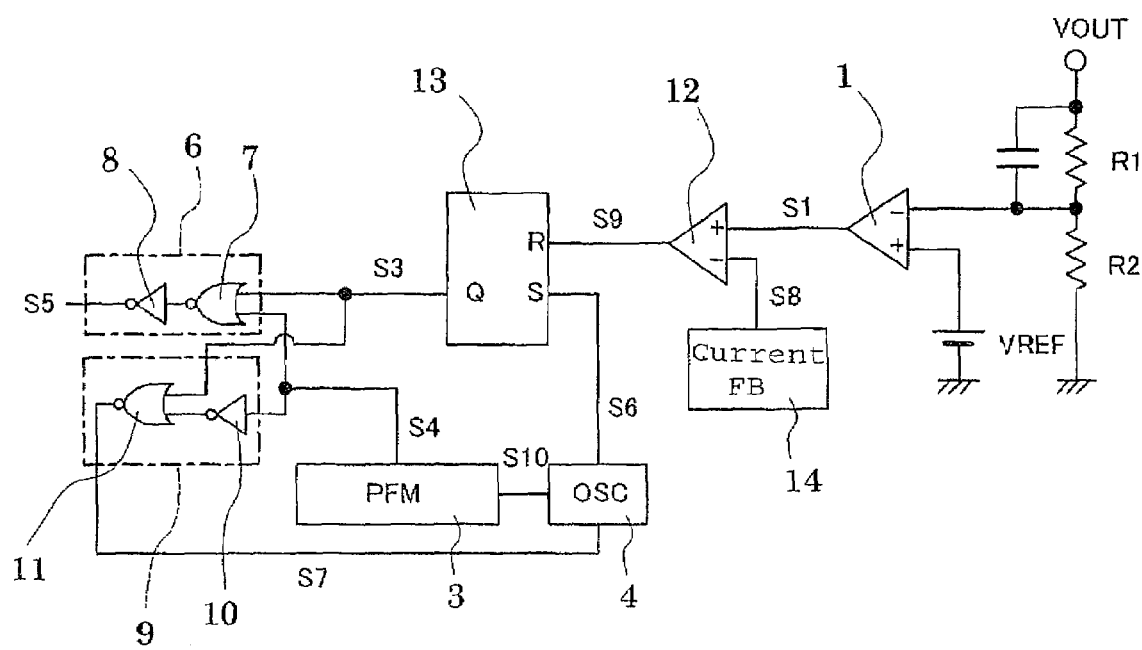
FIG. 7 is a circuit diagram showing a PWM/PFM control circuit according to a third embodiment of the present invention.

FIG. 7 is a circuit diagram showing a PWM/PFM control circuit in a switching power supply circuit according to a third embodiment of the present invention. As shown in this drawing, the PWM/PFM control circuit according to the present embodiment has a PWM comparator 12 and a flip-flop circuit 13. The PWM comparator 12 compares an error signal S1 with a feedback current signal S8 based on a load current I flowing through a chopper circuit which is an object to be controlled, and outputs a reset signal S9 for defining the pulse width of a PWM control signal S3. The flip-flop circuit 13 forms the PWM control signal S3 which rises upon setting by a reference signal S6 as the output signal of an oscillator 4, and which falls upon resetting by the reset signal S9.

A PFM control signal generator 3 according to the present embodiment forms a PFM control signal S4 based on the reference signal S6.

In the present embodiment, like the first embodiment, a differential time signal S7 is supplied to the oscillator 4. Thus, the oscillation frequency of the oscillator 4 is controlled based on the differential time signal S7.

Other features are exactly the same as those of the PWM/PFM control circuit of the switching power supply circuit shown in FIG. 2. Thus, the same portions as those in FIG. 2 are assigned the same numerals and symbols as in FIG. 2, and duplicate explanations are omitted.

In the present embodiment, the flip-flop circuit 13 is set by the reference signal S6, and is reset by the reset signal S9 whose timing of occurrence varies with load. Thus, the PWM control signal S3 having a pulse width that varies with load is obtained. On the other hand, the oscillation frequency of the reference signal S6 changes based on the differential time signal S7 as in the first embodiment.

In the present embodiment, therefore, the same actions and effects as those in the first embodiment are obtained in the same manner as in the first embodiment.

FIRST EXAMPLE

Figure 8:
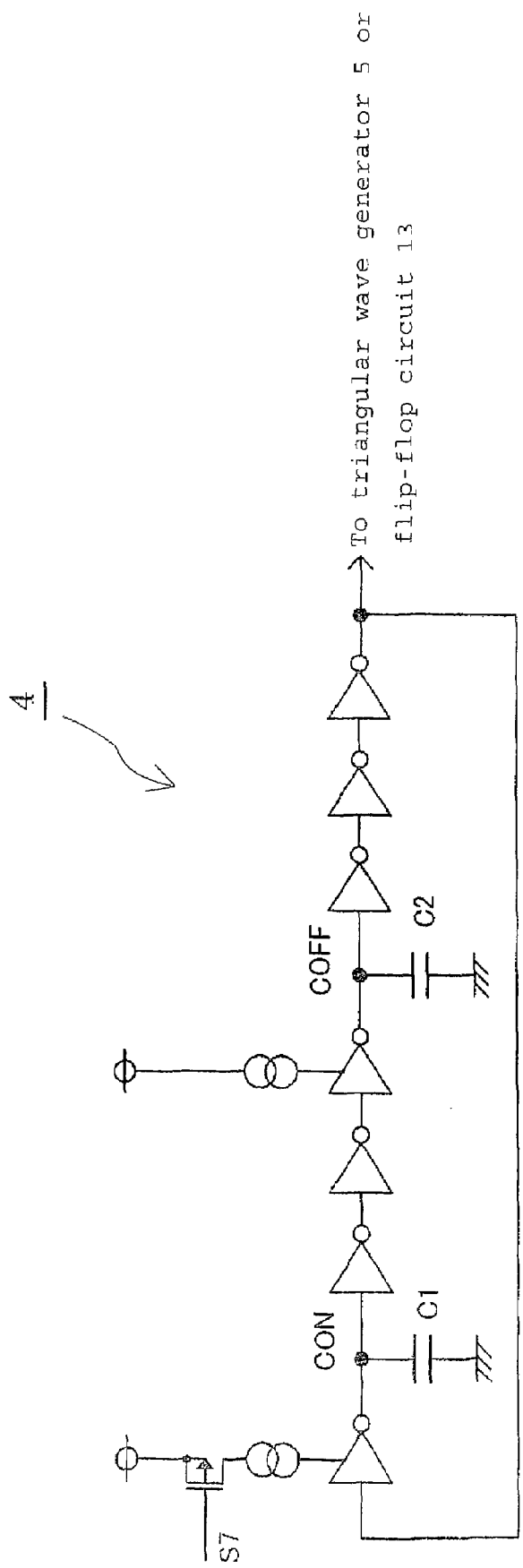
FIG. 8 is a circuit diagram showing a first example which is a concrete example of an oscillator in the PWM/PFM control circuits shown in FIGS. 2 and 7.

FIG. 8 is a circuit diagram showing a first example which is a concrete example of the oscillator 4 in the PWM/PFM control circuits shown in FIGS. 2 and 7. As shown in this drawing, an oscillator 4 according to the present example is formed from a ring oscillator having an oscillation frequency defined by the charging times of capacitors C1 and C2. A charging current for charging the input-side capacitor C1 of the ring oscillator is blocked by a differential time signal S7 to delay the timing of oscillation, thereby controlling the oscillation frequency of the reference signal S6 to a low value.

In the present example, a charging current for the input-side capacitor C1 becomes a triangular wave comprising pulses repeating on a predetermined cycle (oscillation cycle) if the differential time signal S7 is absent. When the differential time signal S7 occurs, a voltage CON is blocked for a time corresponding to the differential time a, b or c. Thus, the relevant portions take a flat waveform, and the timing of rise shifts by the differential time a, b or c. As a result, the oscillation frequency of the reference signal S6 can be lowered in accordance with the differential time a, b or c.

SECOND EXAMPLE

Figure 9:
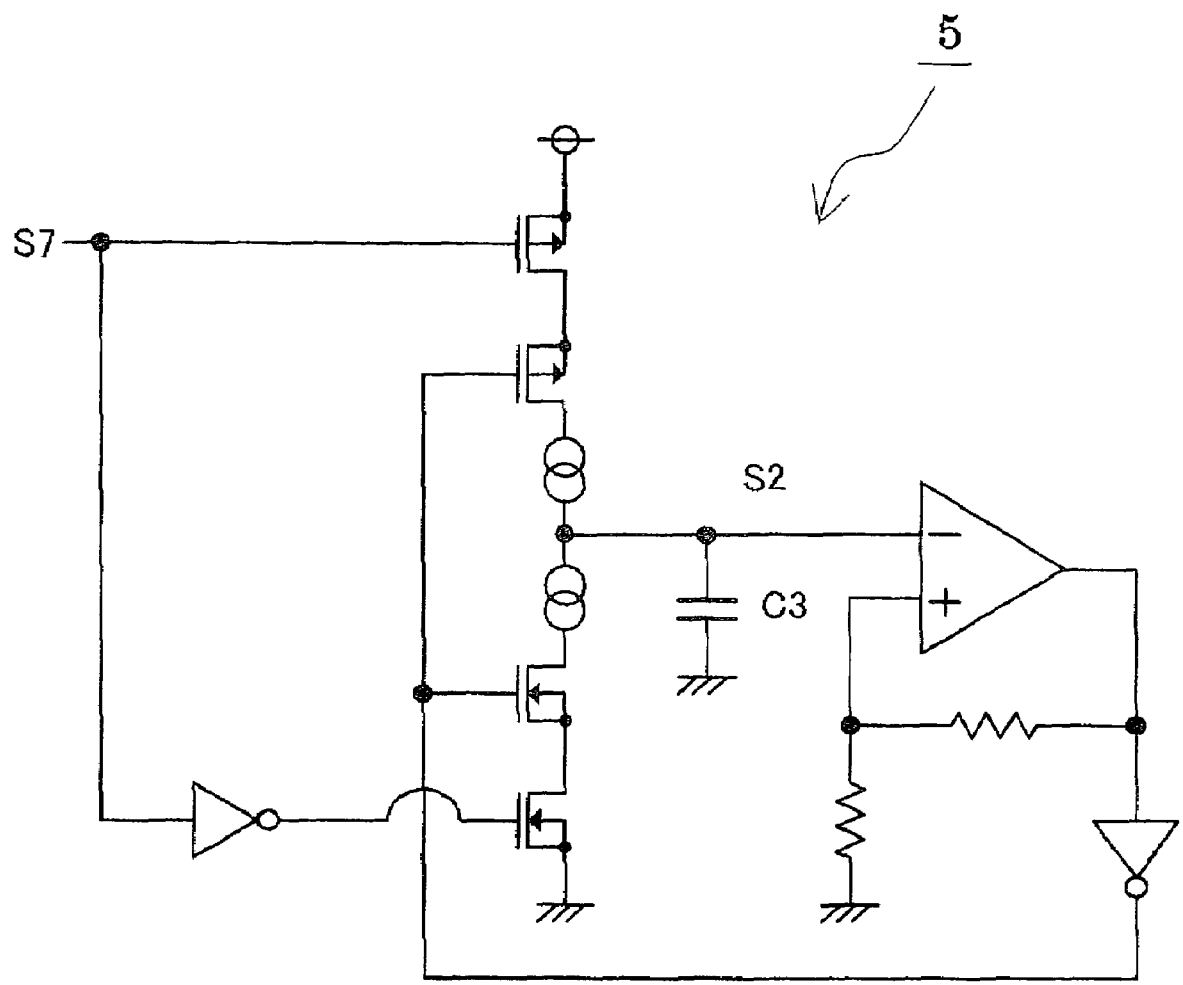
FIG. 9 is a circuit diagram showing a second example which is a concrete example of a triangular wave generator in the PWM/PFM control circuit shown in FIG. 5.

FIG. 9 is a circuit diagram showing a second example which is a concrete example of the triangular wave generator 5 in the PWM/PFM control circuit shown in FIG. 5. As shown in this drawing, a triangular wave generator 5 according to the present example generates a ramp signal S2 by utilizing the charging and discharging of a capacitor C3. A charging or discharging current for charging or discharging the capacitor 3 is blocked by a differential time signal S7 to delay the timing of rise of the ramp signal S2, which functions as a reference signal, thereby controlling its oscillation frequency to a low value.

The present invention can be used, for example, in the industrial field of electronic equipment where a switching power supply circuit for forming a power supply circuit in a cellular phone or a personal computer is produced and marketed.

Although the present invention has been described by the above embodiments and examples, it should be understood that the invention is not limited to them, but may be varied in many ways. Such changes, substitutions and alterations can be made therein without departing from the spirit and scope of the invention as defined by the appended claims.

What is claimed is:

1. A PWM/PFM control circuit which, when a load on an object to be controlled is a heavy load of a predetermined value or higher, acts under PWM control for determining a pulse width in accordance with the load, and which, when the load is a light load of less than the predetermined value, acts under PFM control for determining a frequency in accordance with the load, the PWM/PFM control circuit having differential time generating means for forming a differential time signal representing a differential time corresponding to a difference between a pulse width of a PWM control signal and a pulse width of a PFM control signal on condition that the pulse width of the PWM control signal is smaller than the pulse width of the PFM control signal, and wherein an oscillation frequency of a reference signal serving as a reference for forming the PWM control signal is controlled based on the differential time signal to a low value in accordance with the differential time.

2. The PWM/PFM control circuit according to claim 1, wherein the PFM control signal is formed based on the PWM control signal.

3. The PWM/PFM control circuit according to claim 2, wherein the differential time generating means forms the differential time signal representing the differential time based on an on-period determined by the PFM control signal during an off-period determined by the PWM control signal, and an oscillation frequency of an oscillator for generating the reference signal is controlled based on the differential time signal.

4. The PWM/PFM control circuit according to claim 2, wherein the differential time generating means forms the differential time signal representing the differential time based on an on-period determined by the PFM control signal during an off-period determined by the PWM control signal, and a triangular wave generator for generating a ramp signal functioning as the reference signal is controlled based on the differential time signal.

5. The PWM/PFM control circuit according to claim 1, wherein the differential time generating means forms the differential time signal representing the differential time based on an on-period determined by the PFM control signal during an off-period determined by the PWM control signal, and an oscillation frequency of an oscillator for generating the reference signal is controlled based on the differential time signal.

6. The PWM/PFM control circuit according to claim 5, wherein the oscillator is formed from a ring oscillator, and a charging current for charging an inlet-side capacitor of the ring oscillator is blocked by the differential time signal, whereby the oscillation frequency of-the reference signal serving as the reference for forming the PWM control signal is controlled to the low value.

7. The PWM/PFM control circuit according to claim 1, wherein the differential time generating means forms the differential time signal representing the differential time based on an on-period determined by the PFM control signal during an off-period determined by the PWM control signal, and a triangular wave generator for generating a ramp signal functioning as the reference signal is controlled based on the differential time signal.

8. The PWM/PFM control circuit according to claim 7, wherein the triangular wave generator generates the ramp signal by utilizing charging or discharging of a capacitor, and a charging or discharging current for charging or discharging the capacitor is blocked by the differential time signal, whereby the oscillation frequency of the ramp signal, which is the reference signal serving as the reference for forming the PWM control signal, is controlled to the low value.

9. A switching power supply circuit comprising a combination of the PWM/PFM control circuit according to claim 8 and a chopper circuit which is the object to be controlled.

10. The PWM/PFM control circuit according to claim 1, further comprising:
an oscillator for generating the reference signal;
a triangular wave generator for generating a ramp signal based on the reference signal;
a PWM control signal generator which compares an error signal with the ramp signal to generate a PWM control signal having a pulse width conformed to the error signal, the error signal representing a difference between a signal representing a voltage of an output terminal of the object to be controlled, and a predetermined reference value, and the error signal being obtained by comparing the signal with the predetermined reference value;
a PFM control signal generator for generating a PFM control signal based on the PWM control signal;
a logic circuit for feeding a switch control signal which controls an on-off state of a switching element of the object to be controlled, based on the PWM control signal or the PFM control signal whichever has the larger pulse width; and
the differential time generating means for forming the differential time signal representing the differential time corresponding to the difference between the pulse width of the PWM control signal and the pulse width of the PFM control signal, and
wherein an oscillation frequency of the oscillator is controlled based on the differential time signal.

11. The PWM/PFM control circuit according to claim 10, wherein
the oscillator is formed from a ring oscillator, and
a charging current for charging an inlet-side capacitor of the ring oscillator is blocked by the differential time signal, whereby the oscillation frequency of the reference signal serving as the reference for forming the PWM control signal is controlled to the low value.

12. The PWM/PFM control circuit according to claim 1, further comprising:
a triangular wave generator for generating a ramp signal which is the reference signal;
a PWM control signal generator which compares an error signal with the ramp signal to generate a PWM control signal having a pulse width conformed to the error signal, the error signal representing a difference between a signal representing a voltage of an output terminal of the object to be controlled, and a predetermined reference value, and the error signal being obtained by comparing the signal with the predetermined reference value;
a PFM control signal generator for generating a PFM control signal based on the PWM control signal;
a logic circuit for feeding a switch control signal which controls an on-off state of a switching element of the object to be controlled, based on the PWM control signal or the PFM control signal whichever has the larger pulse width; and
the differential time generating means for forming the differential time signal representing the differential time corresponding to the difference between the pulse width of the PWM control signal and the pulse width of the PFM control signal, and
wherein an oscillation frequency of the ramp signal of the triangular wave generator is controlled based on the differential time signal.

13. The PWM/PFM control circuit according to claim 12, wherein
the triangular wave generator generates the ramp signal by utilizing charging or discharging of a capacitor, and
a charging or discharging current for charging or discharging the capacitor is blocked by the differential time signal, whereby the oscillation frequency of the ramp signal, which is the reference signal serving as the reference for forming the PWM control signal, is controlled to the low value.

14. A switching power supply circuit comprising a combination of the PWM/PFM control circuit according to claim 13 and a chopper circuit which is the object to be controlled.

15. The PWM/PFM control circuit according to claim 1, further comprising:
a PWM comparator which compares an error signal with a feedback current signal to output a reset signal for defining the pulse width of the PWM control signal, the error signal representing a difference between a signal representing a voltage of an output terminal of the object to be controlled, and a predetermined reference value, the error signal being obtained by comparing the signal with the predetermined reference value, and the feedback current signal being based on a current flowing through the object to be controlled;
an oscillator for generating the reference signal;
a flip-flop circuit for forming the PWM control signal which rises upon setting by the reference signal and falls upon resetting by the reset signal;
a PFM control signal generator for generating the PFM control signal based on the reference signal;
a logic circuit for feeding a switch control signal which controls an on-off state of a switching element of the object to be controlled, based on the PWM control signal or the PFM control signal whichever has the larger pulse width; and
the differential time generating means for forming the differential time signal representing the differential time corresponding to the difference between the pulse width of the PWM control signal and the pulse width of the PFM control signal, and
wherein an oscillation frequency of the oscillator is controlled based on the differential time signal.

16. The PWM/PFM control circuit according to claim 15, wherein
the oscillator is formed from a ring oscillator, and
a charging current for charging an inlet-side capacitor of the ring oscillator is blocked by the differential time signal, whereby the oscillation frequency of the reference signal serving as the reference for forming the PWM control signal is controlled to the low value.

17. A switching power supply circuit comprising a combination of the PWM/PFM control circuit according to claim 1 and a chopper circuit which is the object to be controlled.

* * * * *

UNITED STATES PATENT AND TRADEMARK OFFICE
CERTIFICATE OF CORRECTION

PATENT NO. : 7,579,820 B2  Page 1 of 1
APPLICATION NO. : 11/866729
DATED : August 25, 2009
INVENTOR(S) : Hane It is certified that error appears in the above-identified patent and that said Letters Patent is hereby corrected as shown below:

Column 12, Line 56, Claim 17, "claim 1" should read -- claim 13 --

Signed and Sealed this

Twenty-ninth Day of December, 2009

David J. Kappos
*Director of the United States Patent and Trademark Office*